US011612878B2

(12) United States Patent
Sun et al.

(10) Patent No.: US 11,612,878 B2
(45) Date of Patent: Mar. 28, 2023

(54) SYNTHESIS AND APPLICATION OF A NANOMATERIAL FOR REMOVAL OF PATULIN

(71) Applicant: Jiangnan University, Wuxi (CN)

(72) Inventors: Xiulan Sun, Wuxi (CN); Yongli Ye, Wuxi (CN); Jian Ji, Wuxi (CN); Fuwei Pi, Wuxi (CN); Yinzhi Zhang, Wuxi (CN); Wei Guo, Wuxi (CN); Xueqing Shan, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 738 days.

(21) Appl. No.: 16/508,332

(22) Filed: Jul. 11, 2019

(65) Prior Publication Data
US 2019/0329221 A1    Oct. 31, 2019

(30) Foreign Application Priority Data

Jul. 25, 2018 (CN) .......................... 201810823902.3

(51) Int. Cl.
| | | |
|---|---|---|
| B01J 20/26 | (2006.01) |
| A23L 2/02 | (2006.01) |
| A23L 2/70 | (2006.01) |
| B01J 20/06 | (2006.01) |
| B01J 20/10 | (2006.01) |
| B01J 20/24 | (2006.01) |
| B01J 20/28 | (2006.01) |
| B01J 20/32 | (2006.01) |
| H01F 1/34 | (2006.01) |

(52) U.S. Cl.
CPC ............... *B01J 20/268* (2013.01); *A23L 2/02* (2013.01); *A23L 2/70* (2013.01); *B01J 20/06* (2013.01); *B01J 20/103* (2013.01); *B01J 20/24* (2013.01); *B01J 20/28007* (2013.01); *B01J 20/28009* (2013.01); *B01J 20/28016* (2013.01); *B01J 20/3204* (2013.01); *B01J 20/3212* (2013.01); *B01J 20/3214* (2013.01); *B01J 20/3278* (2013.01); *B01J 20/3293* (2013.01); *H01F 1/342* (2013.01); *A23V 2002/00* (2013.01)

(58) Field of Classification Search
CPC .......................... B01J 20/268; B01J 20/28009
See application file for complete search history.

*Primary Examiner* — Peter F Godenschwager
(74) *Attorney, Agent, or Firm* — IPro, PLLC

(57) ABSTRACT

The present disclosure belongs to the technical field of analytical chemistry, in particular to synthesis and application of a nanomaterial for removal of patulin (Pat). The present disclosure adopts 2-Oxin as a substitute template, AM as a functional monomer, and synthetic $Fe_3O_4@SiO_2@CS$-GO magnetic nanoparticles as a carrier, for preparing a magnetic MIP specific for Pat adsorption by surface imprinting. The addition of $Fe_3O_4$ makes the finally prepared molecular imprinted adsorbent material magnetic, thereby facilitating separation of a material from a matrix, eliminating complicated operation steps such as filtration and centrifugation, and facilitating recovery of materials.

7 Claims, 5 Drawing Sheets

SYNTHESIS AND APPLICATION OF A NANOMATERIAL FOR REMOVAL OF PATULIN

TECHNICAL FIELD

The disclosure herein relates to the field of analytical chemistry, and in particular relates to synthesis and application of a nanomaterial for removal of patulin.

BACKGROUND

Patulin (Pat) is a toxic secondary metabolite produced by filamentous fungi such as *Penicillium, Aspergillus,* and *Byssochlamys*. Research has found that pollution of fruits and vegetables by Pat is global, and countries including the United States, Japan, the United Kingdom, Canada, Spain, France and other places have detected excessive levels of Pat. Pat mainly infects the damage on the surface of fruits and is therefore often found in moldy fruits and vegetables. Because apple juice is acidic, and Pat has a certain thermal stability in a low pH environment, it is difficult to remove Pat by pasteurization. Pat still has 45% residual after being heated at 80° C. for 20 min, so the probability of introducing Pat into apple juice and other apple products is very high.

Molecular imprinting technique (MIT) refers to imprinting and replication of the structure, size and shape of a target molecule at the molecular level to prepare a molecular imprinted polymer (MIP) with specific recognition ability. In recent years, molecular imprinting techniques have been widely used in many fields. However, there have been no molecular imprinted materials suitable for detecting patulin.

SUMMARY

The present disclosure provides a synthesis method and application of a nanomaterial for removal of patulin. The present disclosure obtains a nanomaterial capable of recognizing and specifically binding to patulin, and uses the nanomaterial to industrial production for removing patulin from apple juice.

A synthesis method of a nanomaterial for removal of patulin provided by the present disclosure adopts 2-oxindole as a substitute template, acrylamide as a functional monomer, and $Fe_3O_4@SiO_2@CS$-GO magnetic nanoparticles as a carrier, for preparing a magnetic molecular imprinted nanomaterial by surface imprinting.

Further, the preparation method of the magnetic molecular imprinted nanomaterial comprises preparation of $Fe_3O_4$ magnetic cores; preparation of $Fe_3O_4@SiO_2$ nanoparticles; amination of the $Fe_3O_4@SiO_2$ nanoparticles and synthesis of the $Fe_3O_4@SiO_2$ nanoparticles; binding of GO carriers to the $Fe_3O_4@SiO_2@CS$ nanoparticles; and synthesis of $Fe_3O_4@SiO_2@CS$-GO@MIP by surface imprinting.

Further, the preparation method of the $Fe_3O_4$ magnetic cores is as follows: dissolving $FeCl_3.6H_2O$ in ethylene glycol, adding anhydrous sodium acetate and trisodium citrate, continuously stirring for 0.5 to 2 h, and allowing the reaction liquid to react at 160 to 250° C. for 2 to 5 h to obtain a $Fe_3O_4$ mother liquid after cooling at normal temperature.

Further, the concentration of the $FeCl_3.6H_2O$ is 20 to 30 g/L.

Further, the concentrations of anhydrous sodium acetate and trisodium citrate are 50 to 65 g/L, respectively.

Further, a magnet additionally added to the $Fe_3O_4$ mother liquid to separate the black $Fe_3O_4$ nanoparticles from the mother liquid, and then the $Fe_3O_4$ nanoparticles are washed with ultrapure water and absolute ethanol, and finally dispersed in ultrapure water.

Further, the preparation method of the $Fe_3O_4@SiO_2$ nanoparticles is as follows: adding $Fe_3O_4$ magnetic liquid to anhydrous ethanol, adding ammonia water ($NH_3.H_2$) dropwise, reacting for 30 min, then, adding tetraethyl orthosilicate (TEOS) dropwise, and reacting for 2 to 5 hours to obtain a $Fe_3O_4@SiO_2$ core-shell nanoparticle dispersion.

Further, the amount of the ammonia water added is 8 to 15 mL/L.

Further, the amount of the tetraethyl orthosilicate added is 3.5 to 5 mL/L.

Further, amination of the $Fe_3O_4@SiO_2$ nanoparticles is as follows: adding 3-aminopropyltrimethoxysilane (APTMS) dropwise to the $Fe_3O_4@SiO_2$ dispersion and stirring for 1 to 3 h to obtain aminated $Fe_3O_4@SiO_2$ nanoparticles.

Further, the synthesis steps of the $Fe_3O_4@SiO_2@CS$ nanoparticles include a method for preparing a CS acetic acid solution as follows: placing CS powder in 2% acetic acid, and performing heating and stirring to dissolve the CS powder to obtain a CS acetic acid solution having a concentration of 8 to 15 g/L.

Further, the preparation method of the $Fe_3O_4@SiO_2@CS$-GO nanoparticle is as follows: mixing the aminated $Fe_3O_4@SiO_2$ dispersion with the CS acetic acid solution, performing heating and stirring in a constant temperature water bath at 45 to 60° C. for 0.5 to 2 h, then adding a GO dispersion and continuing stirring for 0.5 to 2 h, finally, raising the temperature to 70 to 90° C., and dropwise adding a glutaraldehyde solution having a mass fraction of 5% to obtain the $Fe_3O_4@SiO_2@CS$-GO nanoparticles.

Further, the amount of the glutaraldehyde added is 0.4 to 0.6 mL/mL.

Further, the synthesis of $Fe_3O_4@SiO_2@CS$-GO@MIP also comprises preparation of a pre-assembly liquid of template molecules and functional monomers as follows: adding 2-oxindole and acrylamide to a mixed solution of acetonitrile and toluene, and performing magnetic stirring for 2 h to obtain the pre-assembly liquid of template molecules and functional monomers for later use.

Further, the concentration of the 2-oxindole is 2 to 3.5 g/L.

Further, the concentration of the acrylamide is 8 to 12 g/L.

Further, the volume ratio of the acetonitrile to the toluene in the mixed solution is (2 to 5):1.

Further, the synthesis of $Fe_3O_4@SiO_2@CS$-GO@MIP also comprises a step of acrylic acid modification of $Fe_3O_4@SiO_2@CS$-GO: taking a $Fe_3O_4@SiO_2@CS$-GO anhydrous ethanol dispersion, adding acrylic acid to the system while performing ultrasonic dispersion, reacting for 1.5 to 3 h, and finally performing dispersing with an acetonitrile and toluene mixed solution.

Further, the concentration of the acrylic acid is 40 to 60 mL/L.

Further, in the mixed solution, the volume ratio of the acetonitrile to the toluene is (2 to 5):1.

Further, synthesis of $Fe_3O_4@SiO_2@CS$-GO@MIP is as follows: adding the $Fe_3O_4@SiO_2@CS$-GO dispersion modified with vinyl to the pre-assembly liquid for dispersion, then, sequentially adding a cross-linking agent ethylene glycol dimethacrylate (EGDMA) and an initiator azobisisobutyronitrile (AIBN), sealing the whole reaction system, performing degassing by nitrogen for 15 min, and finally performing heating in a water bath at 60° C. for 24 h, and after washing, performing freeze-drying to obtain the gray-black magnetic nanoparticles.

Further, the amount of the ethylene glycol dimethacrylate added is 0.1 to 0.3 mol/L.

Further, the amount of the azodiisobutyronitrile added is 0.3 to 0.5 g/L.

Further, the template molecules are eluted by Soxhlet extraction, and a mixed solution of methanol and acetic acid in a volume ratio of (8 to 10):1 is used as the eluent.

The present disclosure also provides use of the nanomaterial for removal of patulin.

The present disclosure adopts 2-Oxin as a substitute template, AM as a functional monomer, and synthetic $Fe_3O_4@SiO_2@CS$-GO magnetic nanoparticles as a carrier, for preparing a magnetic MIP specific for Pat adsorption by surface imprinting. The addition of $Fe_3O_4$ makes the finally prepared molecular imprinted adsorbent material magnetic, thereby facilitating separation of a material from a matrix, eliminating complicated operation steps such as filtration and centrifugation, and facilitating recovery of materials. However, $Fe_3O_4$ is prone to oxidation reaction and easily agglomerates with each other, so $SiO_2$ acts as a protective layer and is coated on the surface of $Fe_3O_4$ to increase the stability and dispersibility of the magnetic particles. The addition of CS not only crosslinks the magnetic nanoparticles with GO as a connecting medium, but also improves the biocompatibility of the nanoparticles, and the amino (—$NH_2$) and hydroxyl (—OH) groups on the surface of CS also have a certain auxiliary adsorption effect on Pat. The huge specific surface area of the GO increases the adsorption capacity of magnetic MIP to Pat. The molecular imprinted nanomaterial prepared by the present disclosure used for removal of patulin obtains a good removal effect

DETAILED DESCRIPTION

Figure 1:
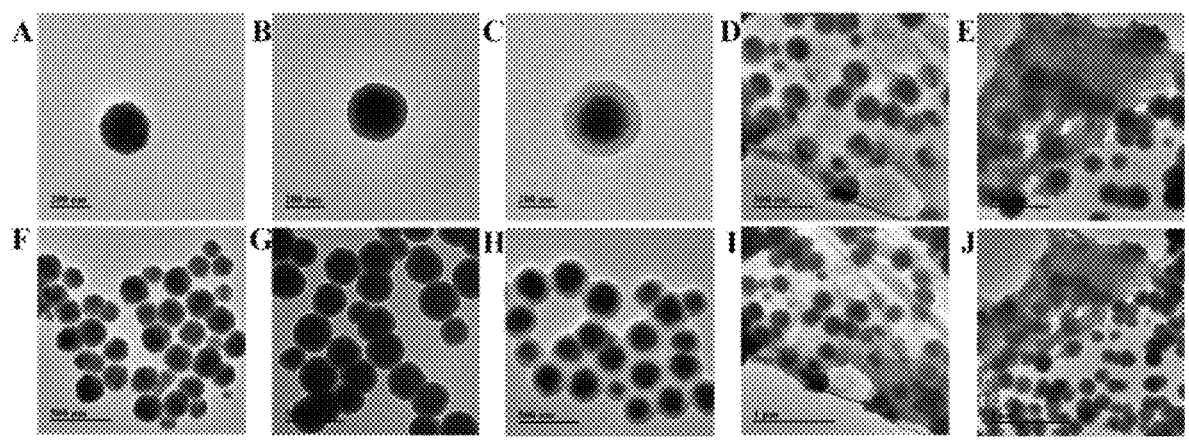
FIG. 1 is a TEM diagram of the nanoparticles in Example 1: (A, F) $Fe_3O_4$; (B, G) $Fe_3O_4@SiO_2$; (C, H) $Fe_3O_4@SiO_2@CS$; (D, I) $Fe_3O_4@SiO_2@CS$-GO; (E, J) $Fe_3O_4@SiO_2@CS$-GO@MIP; (ruler: A, B, C: 200 nm; D, E, F, G, H: 500 nm; I, J: 1 μm).

The graphene oxide (GO) dispersion in the present disclosure was purchased from Xianfeng Nano Materials Co., Ltd.

CS in the present disclosure refers to chitosan.

Those which are not specified with specific conditions in the examples are carried out according to conventional conditions or conditions recommended by manufacturers. Any reagents or instruments that are not indicated with the manufacturers are commercially available products.

EXAMPLE 1

1. Preparation of Fe3O4 Nanoparticles 0.81 g of $FeCl_3.6H_2O$ was weighed and placed in 35 mL of ethylene glycol (EG), magnetic stirring was performed until the $FeCl_3.6H_2O$ solid particles were completely dissolved, then 2 g of anhydrous sodium acetate and 0.75 g of trisodium citrate were added, and stirring was performed continuously for 1 h to obtain a brown yellow reaction liquid. The reaction liquid was transferred and sealed in a 50 mL polytetrafluoroethylene reactor, and reacted at 200° C. for 4 h. After cooling at room temperature, a $Fe_3O_4$ mother liquid was obtained. A magnet was additionally added to the $Fe_3O_4$ mother liquid to separate the black $Fe_3O_4$ nanoparticles from the mother liquid, and then the $Fe_3O_4$ nanoparticles were washed with ultrapure water and absolute ethanol three times, and finally dispersed in ultrapure water for later use.

2. Preparation of $Fe_3O_4@SiO_2$ 10 mL of the $Fe_3O_4$ magnetic liquid (having a $Fe_3O_4$ concentration of 20 mg/mL) was taken, and added to 100 mL of absolute ethanol. The nanoparticles were dispersed evenly with a mechanical stirrer, 1 mL of $NH_3.H_2O$ was added dropwise, and reaction was continued for 30 min. Then, while maintaining vigorous stirring, 0.5 mL of TEOS was added dropwise, and reaction was continued for 4 h to obtain a $Fe_3O_4@SiO_2$ core-shell nanoparticle dispersion.

3. Preparation of $Fe_3O_4@SiO_2@CS$-GO (1). Amination of $Fe_3O_4@SiO_2$

20 μL of 3-aminopropyltrimethoxysilane (APTMS) was added dropwise to the $Fe_3O_4@SiO_2$ dispersion and stirring was performed for 2 h to obtain aminated $Fe_3O_4@SiO_2$ nanoparticles. A magnet was additionally added to collect the $Fe_3O_4@SiO_2$ nanoparticles, and the $Fe_3O_4@SiO_2$ nanoparticles were washed with ultrapure water and absolute ethanol, and dispersed in ultrapure water.

(2). Preparation of CS Acetic Acid Solution 1 g of chitosan (CS) powder was weighed and placed in 100 mL of 2% acetic acid. Heating and stirring were performed to dissolve the CS powder to obtain a CS acetic acid solution.

(3). Synthesis of $Fe_3O_4@SiO_2@CS$-GO 20 mL of the aminated $Fe_3O_4@SiO_2$ dispersion (having a $Fe_3O_4@SiO_2$ concentration of 16 mg/mL) and 20 mL of the CS acetic acid solution were mixed, and heating and stirring were performed in a constant temperature water bath at 50° C. for 1 h. Then 1.7 mL of a graphene oxide (GO) dispersion was added, and stirring was continued for 1 h. Finally, the temperature was raised to 80° C., and 20 mL of a glutaraldehyde solution having a mass fraction of 5% was added dropwise. The obtained $Fe_3O_4@SiO_2@CS$-GO nanoparticles were washed by ultrapure water and absolute ethanol and then dispersed in absolute ethanol.

4. Preparation of $Fe_3O_4@SiO_2@CS$-GO@MIP (1). Preparation of Pre-Assembly Liquid of Template Molecules and Functional Monomers 0.133 g of 2-oxindole (2-Oxin) and 0.517 g of acrylamide (AM) were weighed and added to 50 mL of a mixed solution of acetonitrile and toluene (4:1), and magnetic stirring was performed for 2 h to obtain the pre-assembly liquid of template molecules and functional monomers for later use.

(2). Acrylic Acid Modified $Fe_3O_4@SiO_2@CS$-GO Magnetic Carrier

To stably synthesize MIP on a carrier matrix, modification of the surface of the carrier has become a key step in surface imprinting. 20 mL of a $Fe_3O_4@SiO_2@CS$-GO absolute ethanol dispersion (with a $Fe_3O_4@SiO_2@CS$-GO concentration of 16 mg/mL) was taken, 1 mL of acrylic acid (AA) was added to the system while ultrasonic dispersion was performed, reaction was continued for 2 h, and finally the system was dispersed with 10 mL of an acetonitrile and toluene (4:1) solution.

(3). Polymerization of $Fe_3O_4@SiO_2@CS$-GO@MIP 10 mL of a $Fe_3O_4@SiO_2@CS$-GO dispersion modified with vinyl (with a $Fe_3O_4@SiO_2@CS$-GO concentration of 10 mg/mL) was added to the pre-assembly liquid to perform ultrasonic dispersion, and then 10 mmol of a cross-linking agent ethylene glycol dimethacrylate (EGDMA) and 25 mg of an initiator azodiisobutyronitrile (AIBN) were sequentially added. The whole reaction system was sealed, degassed by nitrogen for 15 min, and finally heated in a water bath at 60° C. for 24 h. After washing, grey black magnetic MIP was obtained by freeze drying.

(4). Elution of $Fe_3O_4@SiO_2@CS$-GO@MIP Template Molecules

The template molecules were eluted by Soxhlet extraction. A mix solution of methanol and acetic acid (9:1) is used as the eluent. The freeze-dried magnetic MIP was placed in a Soxhlet extraction apparatus, and 200 mL of the eluent was prepared and added to a round bottom flask. Soxhlet extraction was performed at a temperature of 80° C., the eluent was replaced once every 12 h, and elution was continued for 48 h until no 2-Oxin was detected in the extract.

FIG. 1 shows the TEM characterization results of five types of nanoparticles: $Fe_3O_4$, $Fe_3O_4@SiO_2$, $Fe_3O_4@SiO_2@CS$, $Fe_3O_4@SiO_2@CS$-GO, and $Fe_3O_4@SiO_2@CS$-GO@MIP in the synthesis process. As shown in FIG. 1(A) and (F), $Fe_3O_4$ has a black spherical structure and a particle diameter of approximately 269 nm. After $SiO_2$ was coated, the appearance is shown in FIGS. 1(B) and (G). The presence of the $SiO_2$ shell layer can be clearly observed from the figure, and the particle diameter is increased to about 351 nm. FIGS. 1(C) and (H) are the TEM characterization diagrams of $Fe_3O_4@SiO_2@CS$. It can be seen from the Figures that after CS is coated, the shell layer is thickened, the particle diameter is further increased to about 397 nm, and the edge of the CS coated layer is not as regular as that of the $SiO_2$ coated layer. Because CS has viscosity, as shown in FIG. 1(H), the $Fe_3O_4@SiO_2@CS$ nanoparticles adhere to each other and are closely arranged. It is also because of rich reactive groups and viscosity of the CS that make the $Fe_3O_4@SiO_2@CS$ more easily bound to GO. The appearance of the $Fe_3O_4@SiO_2@CS$-GO is shown in FIGS. 1(D) and (I). It can be observed from the figures that the $Fe_3O_4@SiO_2@CS$ nanoparticles exist in the GO sheet structure, which proves that the two are successfully bound. FIGS. 1(E) and (J) are TEM diagrams of the $Fe_3O_4@SiO_2@CS$-GO@MIP, and it can be found that a specific pore structure is formed in the magnetic MIP from the edges in the figures.

Figure 2:
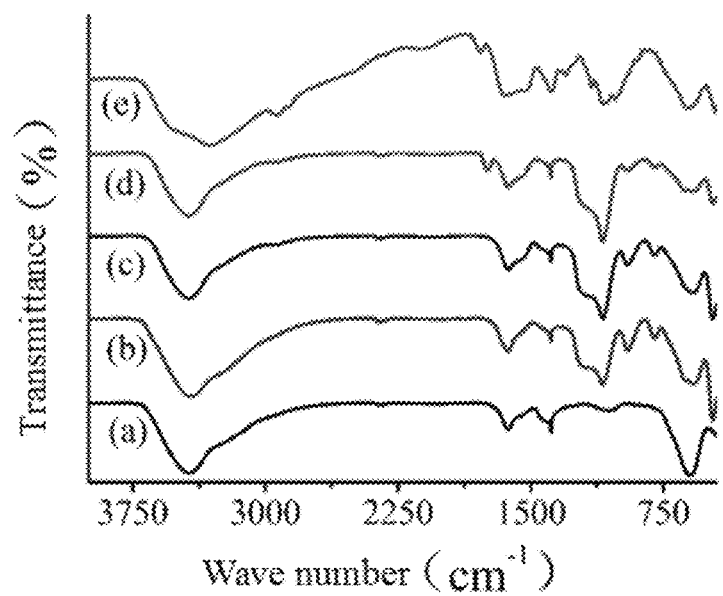
FIG. 2 is an infra-red spectrogram of the nanoparticles in Example 1: (a) $Fe_3O_4$, (b) $Fe_3O_4@SiO_2$, (c) $Fe_3O_4@SiO_2@CS$, (d) $Fe_3O_4@SiO_2@CS$-GO, (e) $Fe_3O_4@SiO_2@CS$-GO@MIP.

FIG. 2 is an infra-red spectrogram of (a) $Fe_3O_4$, (b) $Fe_3O_4@SiO_2$, (c) $Fe_3O_4@SiO_2@CS$, (d) $Fe_3O_4@SiO_2@CS$-GO, and (e) $Fe_3O_4@SiO_2@CS$-GO@MIP in the synthesis process. Observing FIGS. 2(a) to (e), all samples have a strong absorption peak at the wave number of 597 $cm^{-1}$, and the absorption peak is the characteristic absorption peak of the Fe—O group, indicating that $Fe_3O_4$ is always present throughout the reaction process and keeps the nanoparticles magnetic. Compared with FIG. 2(a), FIGS. 2(b) to (e) have the characteristic absorption peak of $SiO_2$ at 1091 $cm^{-1}$, which represents the Si—O—Si stretching vibration, proving that the $SiO_2$ shell coating was successful. In FIGS. 2(c) to (e), the characteristic absorption peak of the CS-NH2 group is at 1556 $cm^{-1}$ and 1625 $cm^{-1}$, which is the $NH_3+$ bending vibration peak, indicating smooth coating of the CS layer. Comparing FIG. 2(d) with FIG. 2(c), it is found that FIG. 2(d) has a C=O stretching vibration peak at 1734 $cm^{-1}$, which is derived from the —COOH group in GO, confirming the successful binding of $Fe_3O_4@SiO_2@CS$ nanoparticles to the GO carriers. In the infrared spectrum of $Fe_3O_4@SiO_2@CS$-GO@MIP (as shown in FIG. 2(e)), the C—O symmetric and asymmetric stretching vibration peaks of the cross-linking agent EGDMA are shown at 1249 $cm^{-1}$ and 1302 $cm^{-1}$, and the C—H stretching vibration peaks in $CH_2$ and $CH_3$ are reflected at 2850 $cm^{-1}$ and 2906 $cm^{-1}$. In addition, the N—H and O—H stretching vibration peaks between 3000 $cm^{-1}$ and 3600 $cm^{-1}$ are broadened and become dull, indicating that intermolecular hydrogen bonds were formed during polymerization of $Fe_3O_4@SiO_2@CS$-GO@MIP, and also proving successful synthesis of magnetic MIP.

Figure 3:
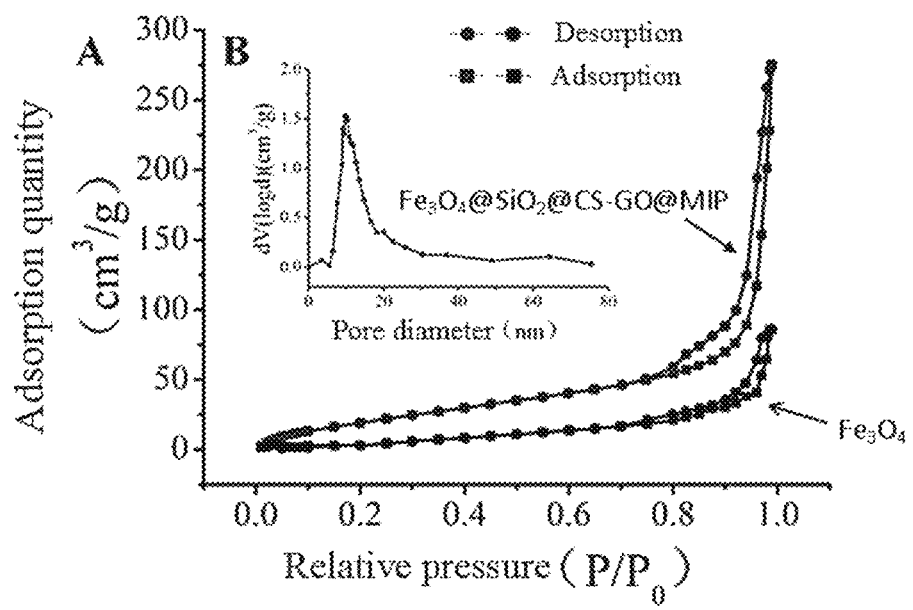
FIG. 3(A) is a $N_2$ adsorption-desorption isothermal diagram of $Fe_3O_4$ and $Fe_3O_4@SiO_2@CS$-GO@MIP in Example 1.
FIG. 3(B) is a pore diameter distribution diagram of $Fe_3O_4@SiO_2@CS$-GO@MIP.

The $N_2$ adsorption-desorption isotherms of $Fe_3O_4$ and $Fe_3O_4@SiO_2@CS$-GO@MIP are shown in FIG. 3(A), and the pore diameter distribution of $Fe_3O_4@SiO_2@CS$-GO@MIP is shown in FIG. 3(B). Compared to $Fe_3O_4$, $Fe_3O_4@SiO_2@CS$-GO@MIP has a larger specific surface area and a larger pore volume (as shown in Table 1). According to the analysis and calculation of a BJH model, the mesoporous pore diameter of $Fe_3O_4@SiO_2@CS$-GO@MIP is mostly distributed around 11.5 nm, which is beneficial to the adsorption of target molecule Pat by magnetic MIP.

TABLE 1

| Specific surface area and total pore volume | | |
|---|---|---|
| Sample name | Specific surface area ($m^2/g$) | Total pore volume ($cm^3/g$) |
| $Fe_3O_4$ | 43.5 | 0.175 |
| $Fe_3O_4@SiO_2@CS$-GO@MIP | 279.6 | 0.476 |

Comparative Example 1

The preparation method of a magnetic non-molecular imprinted polymer $Fe_3O_4@SiO_2@CS$-GO@NIP is consistent with the preparation method of the magnetic molecular imprinted polymer $Fe_3O_4@SiO_2@CS$-GO@MIP, except that the template molecules 2-Oxin were not added.

EXAMPLE 2

1. Detection Method of Patulin

The content of Pat was measured by HPLC. 25 mg of a Pat standard was dissolved in 4 mL of acetonitrile to obtain a Pat mother liquid with a concentration of 6250 mg/L. Pat standard addition apple juice (with a PAT concentration of 100 mg/L) and a group of 10 mg/L, 50 mg/L, 100 mg/L, 150 mg/L, 200 mg/L and 250 mg/L standard working solutions were prepared.

Pretreatment method of samples: A magnet was additionally added to separate magnetic MIP from the apple juice solution. The apple juice clear liquid was poured into a 50 mL test tube with a stopper, 10 mL of ethyl acetate was added, vortex oscillation was performed for 1 min, and then the solution was allowed to stand and layer. The upper organic phase was taken into another test tube, and the above extraction operation was repeated three times. The organic phases were combined, and then the extract was purified by adding 5 mL of a 2% anhydrous sodium carbonate solution. The extract was dehydrated and filtered by weighing 1 g of anhydrous sodium sulfate. The filtrate was immersed in a water bath at 40° C., blow-dried with $N_2$ slowly and re-dissolved with acetonitrile.

Liquid chromatography conditions: The chromatographic column was a C18 reverse phase column (Agilent), the mobile phase was a 20% aqueous solution of acetonitrile containing 0.1% acetic acid, the detector was a UV detector, the detection wavelength was 275 nm, the column temperature was 30° C., the injection volume was 5 µL, the retention time of Pat was 6.427 min, and an external standard peak area method was adopted for quantification.

2. Kinetic Adsorption Experiment 7 groups of 100 mg of $Fe_3O_4@SiO_2@CS$-GO@MIP and 100 mg of $Fe_3O_4@SiO_2@CS$-GO@NIP adsorbent materials were accurately weighed, and placed in a 25 mL conical flask with a stopper respectively. 10 mL of a Pat apple juice solution with a Pat concentration of 100 mg/L was added, and oscillated and adsorbed in a constant temperature water bath at 25° C. Corresponding samples were selected at different time points (4 h, 8 h, 12 h, 16 h, 20 h, 24 h, 28 h). After pretreatment, the content of Pat in the supernatant was determined by HPLC.

Figure 4:
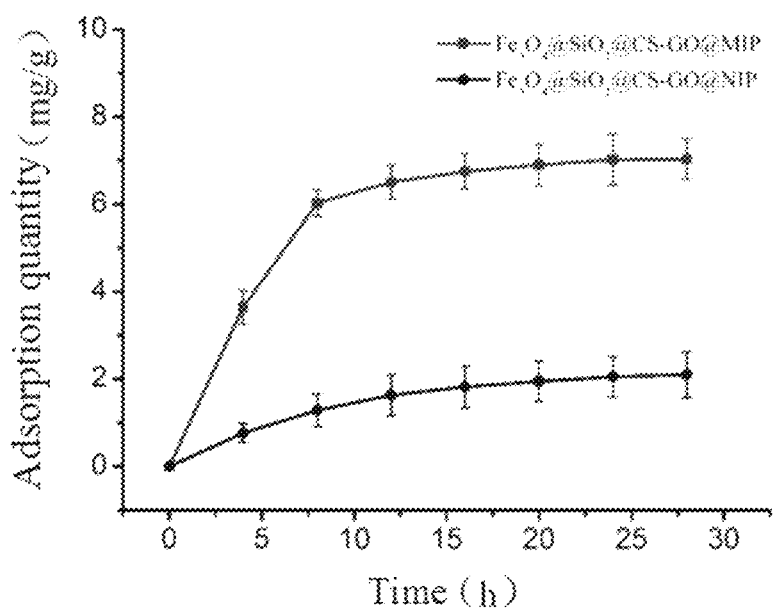
FIG. 4 is an adsorption kinetics curve of $Fe_3O_4@SiO_2@CS$-GO@MIP and $Fe_3O_4@SiO_2@CS$-GO@NIP on Pat in Example 2.

As shown in FIG. 4, as the adsorption time is prolonged, the adsorption quantity of Pat of both $Fe_3O_4@SiO_2@CS$-GO@MIP and $Fe_3O_4@SiO_2@CS$-GO@NIP is gradually increasing, and there was no significant change in the adsorption quantity until 24 h of adsorption. In contrast, the magnetic MIP with template molecules added during polymerization exhibited better adsorption effect than the magnetic NIP without template molecules. At room temperature of 25° C., the saturated adsorption capacity of $Fe_3O_4@SiO_2@CS$-GO@MIP is 3.5 times that of $Fe_3O_4@SiO_2@CS$-GO@NIP. This depends on the specific adsorption site formed in $Fe_3O_4@SiO_2@CS$-GO@MIP.

3. Isothermal Adsorption Experiment 3 groups (8 parts in each group) of 100 mg of $Fe_3O_4@SiO_2@CS$-GO@MIP adsorbent materials were accurately weighed, and placed in a 25 mL conical flask with a stopper respectively. 10 mL of Pat standard addition fruit juice with different concentrations (30 mg/L, 50 mg/L, 70 mg/L, 90 mg/L, 100 mg/L, 110 mg/L, 120 mg/L and 130 mg/L) were added, and oscillated and adsorbed in a constant temperature water bath at different temperatures (25° C., 35° C. and 45° C.) for 24 h. The corresponding samples were selected, and after pretreatment, the content of Pat in the supernatant was measured by HPLC.

Figure 5:
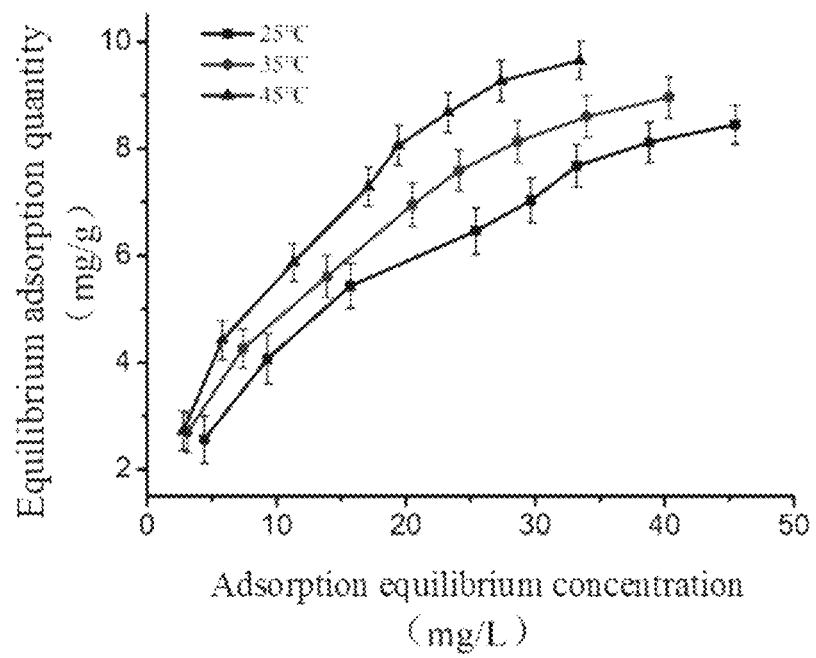
FIG. 5 is an isothermal adsorption curve of $Fe_3O_4@SiO_2@CS$-GO@MIP on Pat in Example 2.

FIG. 5 is an isothermal adsorption curve of $Fe_3O_4@SiO_2@CS$-GO@MIP on Pat at 25° C., 35° C., and 45° C. It can be seen from FIG. 5 that the equilibrium adsorption quantity of the magnetic MIP increases with the initial concentration of the Pat and the temperature, indicating that the adsorption process is an endothermic reaction.

4. Selective Adsorption Experiment

Figure 6:
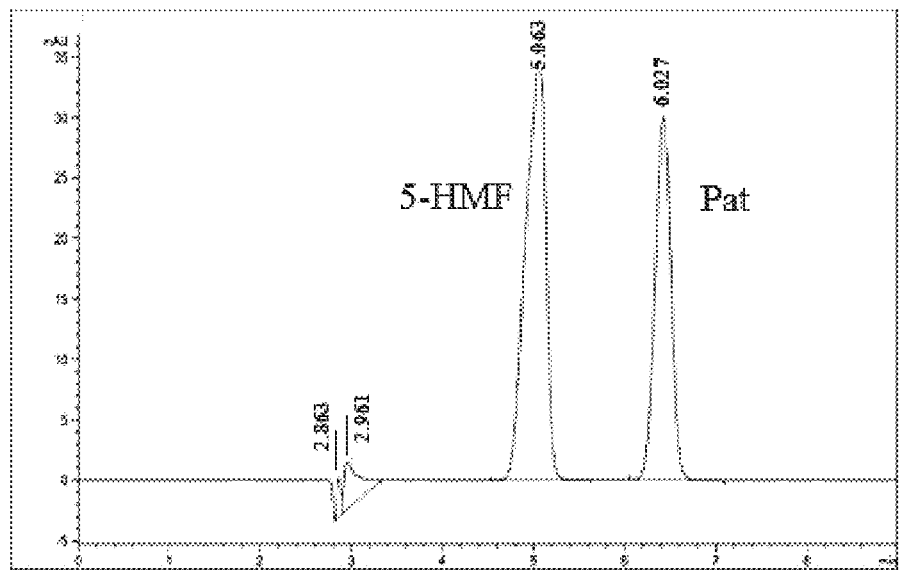
FIG. 6 is a chromatogram of Pat and 5-hydroxymethyl furfural (5-HMF) in Example 2.
Figure 7:
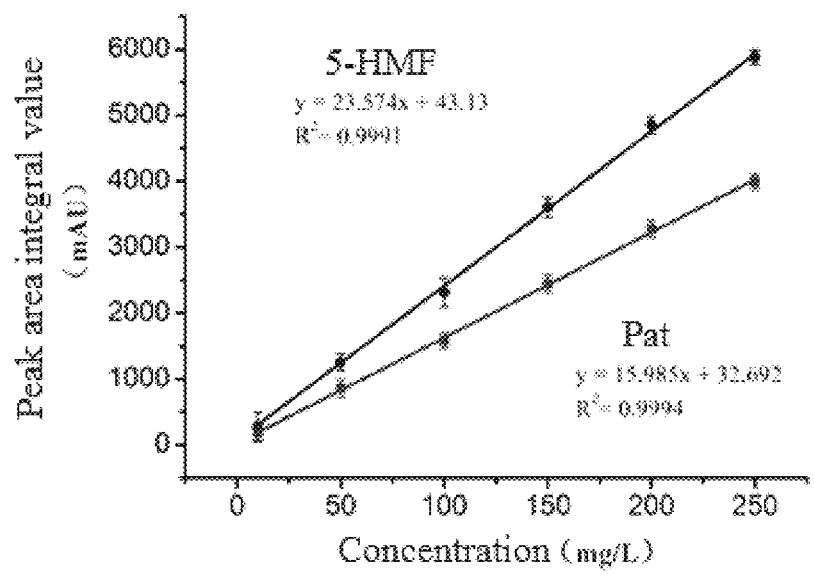
FIG. 7 is a standard curve of Pat and 5-HMF in Example 2.

Standard solutions (with concentration gradients of 10 mg/L, 50 mg/L, 100 mg/L, 150 mg/L, 200 mg/L, and 250 mg/L) of Pat and 5-hydroxymethyl furfural (5-HMF) were prepared. The standard curves of Pat and 5-HMF were plotted using the obtained chromatogram information, as shown in FIGS. 6 and 7. 100 mg of $Fe_3O_4@SiO_2@CS$-GO@MIP and 100 mg of $Fe_3O_4@SiO_2@CS$-GO@NIP adsorbent materials were accurately weighed, and placed in a 25 mL conical flask with a stopper respectively. 10 mL of apple juice mixed solutions containing Pat and 5-HMF (with concentrations of 100 mg/L respectively) were added, and oscillated and adsorbed in a constant temperature water bath for 24 h at room temperature of 25° C. The corresponding samples were selected, and after pretreatment, the content of Pat in the supernatant was measured by HPLC.

Figure 8:
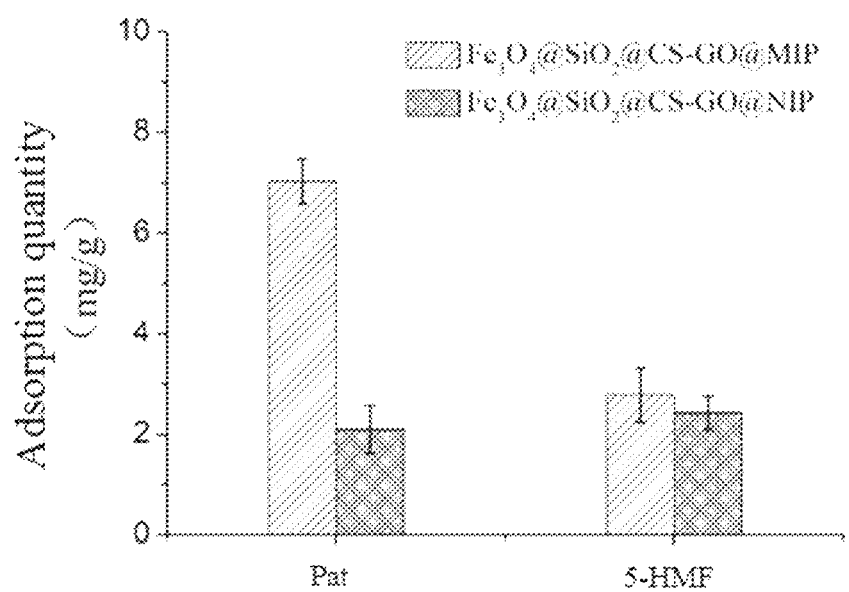
FIG. 8 is an adsorption quantity diagram of $Fe_3O_4@SiO_2@CS$-GO@MIP and $Fe_3O_4@SiO_2$ @CS-GO@NIP on Pat and 5-HMF in Example 2.

As shown in FIG. 8, since $Fe_3O_4@SiO_2@CS$-GO@MIP has specific binding sites for Pat on the surface, its adsorption quantity of Pat is significantly higher than that of 5-HMF. While, since $Fe_3O_4@SiO_2@CS$-GO@NIP does not form specific adsorption pores for Pat on the surface, the adsorption quantity of Pat is low, which is similar to that of 5-HMF.

5. Reuse Experiment 100 mg of $Fe_3O_4@SiO_2@CS$-GO@MIP adsorbent material was accurately weighed, and placed in a 25 mL conical flask with a stopper. 10 mL of a Pat apple juice solution with a Pat concentration of 100 mg/L was added, and oscillated and adsorbed in a constant temperature water bath at 25° C. for 24 h. A magnet was additionally added to recover the material, and the material was eluted and placed in a new Pat standard addition juice solution. The above adsorption and elution process was repeated 5 times. The supernatant of each sample was taken, and after pretreatment, the Pat content was measured by HPLC.

Figure 9:
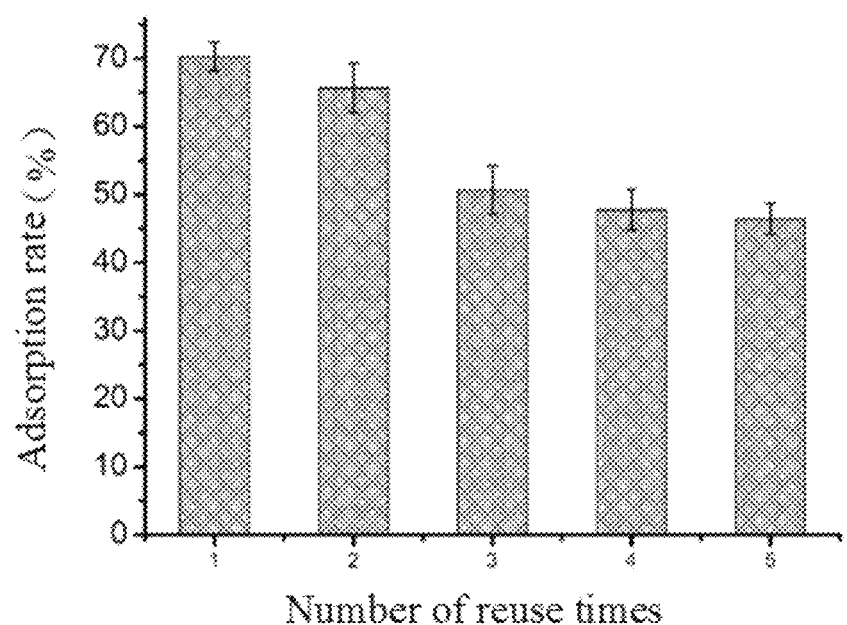
FIG. 9 is a diagram showing the relationship between the adsorption rate of Pat and the number of times of reuse of $Fe_3O_4@SiO_2@CS$-GO@MIP in Example 2.

As shown in FIG. 9, the $Fe_3O_4@SiO_2@CS$-GO@MIP magnetic molecular imprinted adsorbent material can maintain good adsorption characteristics after reuse twice. After reuse 5 times, the adsorption rate of Pat by the magnetic molecular imprinting material decreases slightly, and the adsorption rate decreases by 23.93% compared with the initial use. This may be due to an incomplete elution process, resulting in residual template molecules, and affecting the adsorption effect. It may also be because multiple adsorption oscillations and elution extractions have a certain effect on the magnetic MIP spatial structure, and the specific binding sites suffers from regional damage. However, compared to the non-molecular imprinted polymer $Fe_3O_4@SiO_2@CS$-GO@NIP, $Fe_3O_4@SiO_22@CS$-GO@MIP still exhibits excellent adsorption characteristics for Pat.

Comparative Example 2

Referring to Example 1, the carrier $Fe_3O_4@SiO_2@CS$-GO was replaced with activated silicon spheres prepared by the following method, and the other conditions were unchanged to prepare the molecular imprinted adsorbent material $SiO_2@MIP$.

Preparation of activated silicon: Silicon spheres (mesh) were accurately weighed and put in a three-necked flask, the aqueous solution of methanesulfonic acid was added, and magnetic stirring was performed for reflux reaction. After cooling, the solid matter was filtered off, and the filtered matter was repeatedly washed with secondary deionized water until the washed aqueous solution was neutral. The obtained filtered solid matter was placed in a vacuum oven to be vacuum dried, taken out, and placed in a dry container for later use.

The material obtained in Comparative Example 2 was subjected to an adsorption test with reference to Example 2, and the results are shown in Table 2.

TABLE 2

Adsorption effects of materials obtained in Example 1 and Comparative Example 2

| Adsorbent material | Example 1 | Comparative Example 2 |
|---|---|---|
| Kinetic adsorption (24 h adsorption quantity) | 7.0 mg/g | 3.2 mg/g |
| Isothermal adsorption (25° C.) | 8.4 | 6.1 |
| Reuse (times/adsorption rate) | 5 (47%) | 3 (32%) |

What is claimed is:

1. A synthesis method of a nanomaterial, comprising the following steps:
preparing $Fe_3O_4$ magnetic cores; preparing a dispersion of $Fe_3O_4@SiO_2$ nanoparticles;
performing amination of the $Fe_3O_4@SiO_2$ nanoparticles to obtain a dispersion of aminated $Fe_3O_4@SiO_2$, and performing synthesis of $Fe_3O_4@SiO_2@$ chitosan ($Fe_3O_4@SiO_2CS$) nanoparticles; binding of graphene oxide (GO) carriers to the $Fe_3O_4@SiO_2@CS$ nanoparticles to obtain $Fe_3O_4@SiO_2@CS$-GO; and performing synthesis of $Fe_3O_4@SiO_2@CS$-GO@Molecular Imprinted Polymer ($Fe_3O_4@SiO_2@CS$-GO@MIP) by surface imprinting; wherein the synthesis of $Fe_3O_4@SiO_2@CS$-GO@MIP uses 2-oxindole as a substitute template, acrylamide as a functional monomer, and $Fe_3O_4@SiO_2@CS$-GO as a carrier.

2. The synthesis method according to claim 1, wherein preparing the $Fe_3O_4$ magnetic cores is as follows: dissolving $FeCl_3 \cdot 6H_2O$ in ethylene glycol, adding anhydrous sodium acetate and trisodium citrate, continuously stirring for 0.5 to 2 h, and allowing the reaction liquid to react at 160 to 250° C. for 2 to 5 hours to obtain a $Fe_3O_4$ mother liquid comprising $Fe_3O_4$ magnetic cores.

3. The synthesis method according to claim 1, wherein preparing the $Fe_3O_4@SiO_2$ nanoparticles is as follows: adding the $Fe_3O_4$ magnetic cores to anhydrous ethanol, adding ammonia water dropwise, reacting for 30 minutes, then, adding tetraethyl orthosilicate dropwise, and reacting for 2 to 5 hours to obtain the dispersion of $Fe_3O_4@SiO_2$ nanoparticles.

4. The synthesis method according to claim 1, wherein the performing amination of the $Fe_3O_4@SiO_2$ nanoparticles is as follows: adding 3-aminopropyltrimethoxysilane dropwise to the dispersion of $Fe_3O_4@SiO_2$ nanoparticles and stirring for 1 to 3 hours to obtain aminated $Fe_3O_4@SiO_2$ nanoparticles.

5. The synthesis method according to claim 1, wherein the performing synthesis of the $Fe_3O_4@SiO_2@CS$ nanoparticles comprises: preparing a CS acetic acid solution by placing CS powder in 2% acetic acid, and performing heating and stirring to dissolve the CS powder to obtain the CS acetic acid solution having a concentration of 8 to 15 g/L; mixing the dispersion of aminated $Fe_3O_4@SiO_2$ with the CS acetic acid solution, performing stirring at 45 to 60° C. for 0.5 to 2 hours to obtain a solution of the $Fe_3O_4@SiO_2@CS$ nanoparticles.

6. The synthesis method according to claim 5, wherein the preparation of $Fe_3O_4@SiO_2@CS$-GO nanoparticle is as follows: adding a GO dispersion to the solution of the $Fe_3O_4@SiO_2@CS$ nanoparticles and continuing stirring for 0.5 to 2 hours, raising the temperature to 70 to 90° C., and dropwise adding a glutaraldehyde solution with a mass fraction of 5% to obtain the $Fe_3O_4@SiO_2@CS$-GO nanoparticles.

7. The synthesis method according to claim 1, wherein the synthesis of $Fe_3O_4@SiO_2@CS$-GO@MIP comprises: performing preparation of a pre-assembly liquid of template molecules and functional monomers as follows: adding 2-oxindole and acrylamide to a mixed solution of acetonitrile and toluene, and performing stirring to obtain the pre-assembly liquid of template molecules and functional monomers; adding $Fe_3O_4@SiO_2@CS$-GO modified with vinyl to the pre-assembly liquid for dispersion, then, sequentially adding a cross-linking agent ethylene glycol dimethacrylate and an initiator azobisisobutyronitrile, and reacting at 60° C. for 24 hours to obtain $Fe_3O_4@SiO_2@CS$-GO@MIP.

* * * * *